United States Patent
Ladrón Jiménez

(10) Patent No.: US 12,486,651 B2
(45) Date of Patent: Dec. 2, 2025

(54) SHOWER SET WITH HIDDEN FLEXIBLE HOSE

(71) Applicant: STROHM BATHROOM SOLUTIONS S.A., Binissalem (ES)

(72) Inventor: Roberto Ladrón Jiménez, Saragossa (ES)

(73) Assignee: STROHM BATHROOM SOLUTIONS S.A., Binissalem (ES)

( * ) Notice: Subject to any disclaimer, the term of this patent is extended or adjusted under 35 U.S.C. 154(b) by 304 days.

(21) Appl. No.: 18/037,698

(22) PCT Filed: Nov. 18, 2021

(86) PCT No.: PCT/ES2021/070834
§ 371 (c)(1),
(2) Date: May 18, 2023

(87) PCT Pub. No.: WO2022/106741
PCT Pub. Date: May 27, 2022

(65) Prior Publication Data
US 2024/0018758 A1    Jan. 18, 2024

(30) Foreign Application Priority Data
Nov. 23, 2020 (ES) .............................. ES202031170

(51) Int. Cl.
*E03C 1/02* (2006.01)
*E03C 1/04* (2006.01)
*E03C 1/06* (2006.01)

(52) U.S. Cl.
CPC ............ *E03C 1/021* (2013.01); *E03C 1/0408* (2013.01); *E03C 1/06* (2013.01)

(58) Field of Classification Search
CPC .......... E03C 1/021; E03C 1/023; E03C 1/025; E03C 1/0408; E03C 2001/0417;
(Continued)

(56) References Cited

U.S. PATENT DOCUMENTS 5,870,781 A *  2/1999  Williams ................. E03C 1/06
                                                    4/615
2004/0143897 A1* 7/2004 Kollmann ................ E03F 5/08
                                                    4/570
(Continued)

FOREIGN PATENT DOCUMENTS

EP      0703323 A1     3/1996
GB      2449107 A *   11/2008 ............. B05B 15/00
(Continued)

OTHER PUBLICATIONS

International Search Report with English translation and Written Opinion for PCT/ES2021/070834 mailed Feb. 17, 2022.
(Continued)

*Primary Examiner* — Darren W Gorman
(74) *Attorney, Agent, or Firm* — Notaro, Michalos & Zaccaria P.C.

(57) ABSTRACT

A shower set with a concealed hose has a vertical tube that conceals a mechanism consisting of a cartridge with axial water outlet mounted in reverse position. The vertical tube deforms to integrate a hose and a handheld shower in its contour. The rotation of the vertical tube on its two ends hides or shows the hose and the handheld shower. A system for blocking the rotation when the water is coming out of the upper shower head is provided at an upper end.

8 Claims, 7 Drawing Sheets

(58) Field of Classification Search
CPC .. E03C 1/06; B05B 1/18; B05B 1/185; B05B 15/62; B05B 15/70; A47K 3/28
See application file for complete search history.

(56) References Cited

U.S. PATENT DOCUMENTS

| | | | |
|---|---|---|---|
| 2012/0151669 A1* | 6/2012 | Wilson | F16K 11/085 |
| | | | 4/615 |
| 2016/0237661 A1* | 8/2016 | Teagarden | E03C 1/025 |
| 2019/0218756 A1* | 7/2019 | Baur | E03C 1/06 |
| 2019/0224708 A1* | 7/2019 | Melle | B65H 75/4476 |
| 2020/0181894 A1 | 6/2020 | Chung | |
| 2021/0348371 A1* | 11/2021 | Downey | E03C 1/06 |

FOREIGN PATENT DOCUMENTS

| | | | | |
|---|---|---|---|---|
| JP | H0589558 U | | 12/1993 | |
| JP | H06142000 A | | 5/1994 | |
| JP | 2001008852 A | | 1/2001 | |
| JP | 2008200222 A | * | 9/2008 | ............... A47K 3/28 |
| JP | 6176595 B2 | * | 8/2017 | ............... A47K 3/28 |

OTHER PUBLICATIONS

International Application Status Report for PCT/ES2021/070834 generated Apr. 25, 2023.

* cited by examiner

SHOWER SET WITH HIDDEN FLEXIBLE HOSE

As indicated by its title, this description refers to a shower set in which the shower hose and handheld shower head are hidden when not in use, camouflaged, retracted in a housing created for this purpose in the vertical pipe, which also has a water pipe inside it that conducts it from the taps to the upper sprinkler head. The rotation of this vertical pipe, besides hiding or showing the flexible hose and the handheld shower head, also acts as a selector of water outlets to the upper sprinkler head or to the handheld shower head.

BACKGROUND OF THE INVENTION

Currently in the showers market, and more specifically in the market of shower sets, there is a great variety of formal solutions looking for distinction and a high aesthetic value. The most popular format in this type of shower set is based on a tap with an upper outlet that supplies an upper sprinkler head and a lower outlet for a flexible hose that supplies a handheld shower head and a distribution mechanism inside the tap that supplies either one or the other.

This flexible hose hangs below the tap, makes the shower area unattractive, is unhygienic and needs to be replaced frequently. In the state of the art, there are solutions that look to hide the shower hose that connects the handheld shower head with the taps, known as flexible hose, but most of the existing ones are based on hiding it by sliding it through a hole provided for this purpose, with the problem of noise, clogging, breaking due to the friction, apart from moisture problems in these spaces and the difficult access for cleaning, facts that further make impossible the hygienic conditions of these products.

In the state of the art, we have found some documents that refer to objects or devices for hiding the flexible hose and handheld shower head, but as here shown, they are technically far from the invention described in this summary. Some of these documents are mentioned below.

The document DE10137966A1 refers to a wall-mounted shower set. This set consists of a large rotating around the vertical axis door-like housing that hides in its interior, once closed, the flexible hose and the handheld shower head, together with other tap elements and hydro massage nozzles.

The document JP2008200222A describes a device that hides the flexible hose hanging on a support, where a door-like pivoting part around the vertical axis covers only the flexible hose.

The document EP3501356A1 with the title "Sanitary installation" describes a type of cabinet that hides an automatic retraction mechanism for the flexible hose and has also a support inside to keep the shower handle in vertical position.

Another document, the U.S. Pat. No. 5,870,781A, shows a housing that hides the flexible hose and the handheld shower remains fixed and swings down onto the cavity provided in the housing.

Finally, the document EP3401451A1 shows a solution for the quick connection of the flexible hose and handheld shower head to a tap.

The invention described below includes very innovative details about the connection to wall mounted taps, the outlets selection control and the water locking and safety systems.

DESCRIPTION OF THE INVENTION

The shower set with hidden flexible hose described below consists of a vertical pipe, cylindrical in a short segment of its base, which houses in its interior an innovative water outlet selection mechanism via the upper sprinkler or via the handheld shower head with only a gentle rotation, and deformed in its greater length to house and hide the flexible hose and the handheld shower head. The upper end of the vertical pipe meets a horizontal one fixed to the wall. Between both of them there is a joint hiding the inner mechanism that fixes the handheld shower, which can be magnetic or mechanical and optionally a rotation locking mechanism when the water comes out via the upper sprinkler, to prevent unexpected water outflows through the handheld shower. The horizontal pipe has an adaptable wall fixing piece at one end in order to maintain the bar in vertical position and at the other end, the furthest one from the wall, has a chamfer. This face has a threaded upper sprinkler head with a water outlet projection which can be adjusted at different angles.

The cylindrical base of the shower set hides an innovative mechanism inside, a cartridge with an axial water outlet inserted and fixed upside down, with the spindle pointing downwards and the collectors at the top. The inversion of its position turns it into a water outlet selector or exchanger mechanism, rather than a mixer. Mounted in this way, inverted, it acts in this way; the spindle or nozzle, which has a faceted or knurled surface, is inserted into a water outlet at the top of a tap or into a prepared water outlet in the wall and is fixed to either of them, leaving a leak-proof joint. The water previously mixed in the tap flows in through the spindle or nozzle, which was previously the outlet and is now the collector. The ceramic elements, which previously acted as a mixer, now act as a selector and the hot and cold water collectors now act as a water outlet to the upper sprinkler or water outlet to the handheld shower head.

The selector function of the cartridge with upside down axial water outlet is activated by rotating the shower set vertical pipe. When the flexible hose and the handheld shower head re-main hidden, the selector leads the water to the upper sprinkler, while when the flexible hose and the handheld shower head are visible by rotating the pipe 180°, the selector leads the water to the handheld shower.

The shape of the vertical pipe is cylindrical at its base to house the cartridge described above. From this short section of vertical pipe, the cylinder is deformed along most of its length, in such a way that it is regular and concave in appearance at the frontal view and the other half of the view becomes convex. The new shape of the section of this long section of the vertical pipe, similar to a rounded half-moon, camouflages, houses and integrates the assembly comprising the flexible hose and the handheld shower in its convex side. In the inner side of the deformed vertical pipe, a water line is inserted and hidden, leading the water to the upper sprinkler. The transition from the concave to the convex face generates a chamfer where a hole is drilled to open an outlet to the outside of the flexible hose from the corresponding water outlet of the cartridge with axial water outlet.

The vertical pipe, at its upper free end, is joined to another horizontal pipe. This joint hides an attachment piece in its interior that forms part of the mechanism that fixes the flexible hose and handheld shower assembly to the pipe. This attachment can be magnetic, an consists of a magnetic piece inserted in the central bar that attracts and fixes the assembly when the upper closing piece of the handheld shower, which is ferromagnetic, approaches it, or it can be mechanical, by means of a coupling set between the upper closing piece of the handheld shower and a coupling piece located in the joint. This union between vertical and horizontal pipe can also house a rotation locking system to prevent simultaneous activation of the upper sprinkler and handheld shower if the bar is rotated, avoiding this way unexpected splashes.

As described in previous paragraphs, when the central bar is in the position of the hidden flexible hose and handheld shower, the water line to the upper sprinkler is open, so that the water pressure passing through this line raises a plunger that blocks the rotation. When the water stops passing through, a spring returns the plunger to its original position allowing again the rotation of the vertical pipe. The closed plunger rests in a slotted contour around its base to allow automatic drainage of water from the upper sprinkler and horizontal pipe into the inner water line of the vertical pipe when the water supply is interrupted.

The inner water line and the flexible hose and handheld shower assembly running parallel to the vertical pipe are connected to the upper side of the taps. This connection type allows gravity to act, favouring this way the complete evacuation of the water inside, provided that the tap to which they are connected has an automatic evacuation system.

The horizontal pipe is fixed to the wall, at the end closed to it has a position adjusting and correcting mechanism in order to ensure that the vertical pipe can be adapted to any tap and can maintain a perfectly vertical position. This horizontal pipe can be divided into two sections of different diameters so that it can be telescopically adjusted to vary its length. The free end of this horizontal pipe can be cut to an angle and an upper sprinkler can be fixed to this face resulting from the angle cut, which remains in an inclined position in relation to the horizontal line. There is also the option of a single, straight horizontal pipe without telescopic adjustment, closing its free edge with a piece that allows a horizontal fixing of the upper sprinkler.

The skilled person in the art will easily understand that you can combine features of different embodiments with features of other possible embodiments, provided that such a combination is technically possible.

DESCRIPTION OF THE DRAWINGS

For a better understanding of the purpose of the present invention, the annexed drawing shows a practical and preferred embodiment.

PREFERRED EMBODIMENT OF THE INVENTION

Figure 1:
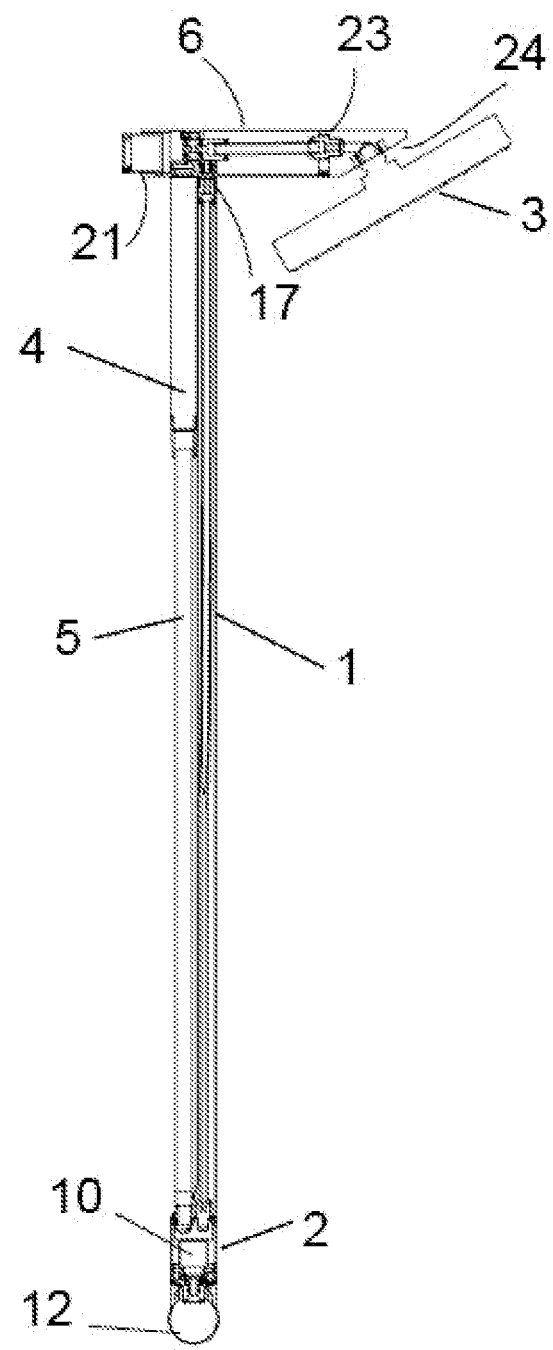
FIG. 1.—Shows a section in a profile view of the whole shower set assembly with the vertical pipe (1) connected to the tap (12).

The shower set object of the present invention, as shown in FIG. 1, comprises a vertical pipe (1) hiding inside of its cylindrical base (2) a cartridge with axial water outlet (10) placed upside down, inverting the water inlet and outlet and making the cartridge function as a selector instead of a mixer. From this cartridge and water line connector to the sprinkler (14) and the water line connector to the handheld shower (15), the vertical pipe is deformed in its section (16) to give it a rounded "half-moon" shape to camouflage the handheld shower (4) and the flexible hose (5) in its convex side. The vertical pipe (1) is closed at its upper end with a joint (17) with the horizontal pipe (6), which guides the rotation of the vertical pipe (1).

The horizontal pipe, which is divided into two sections in order to have telescopic adjustment (23), is fixed to the wall at one end and is also fitted with an adjustment and correction mechanism (21), the opposite free edge is cut to an angle and the upper sprinkler (3) is screwed into the face (24) formed by the angle cut.

Figure 2:
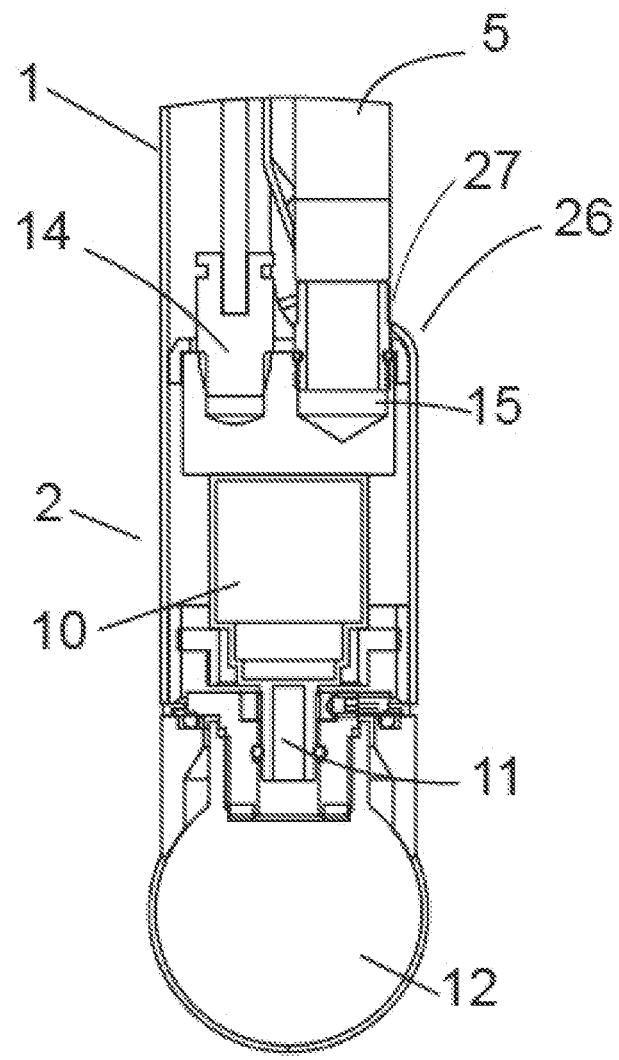
FIG. 2.—Shows the detailed section of the lower part of FIG. 1 of the shower set, the cylindrical base (2) of the vertical pipe (1) and the cartridge with axial water outlet (10) inside it on a tap (12).

FIG. 2 shows a detailed section of the cylindrical base (2) of the shower set vertical pipe (1). The cartridge with axial water outlet (10) can be clearly seen inverted, the spindle (11) fitted and fixed to the tap (12) acts as a collector for the mixed water coming from the tap (12). The ceramic cartridges of the cartridge with axial water outlet (10) act as selectors instead of mixers and, by rotating the vertical pipe (1), lead the water to the water outlet of the sprinkler (14) or to the water outlet of the handheld shower (15).

Figure 3:
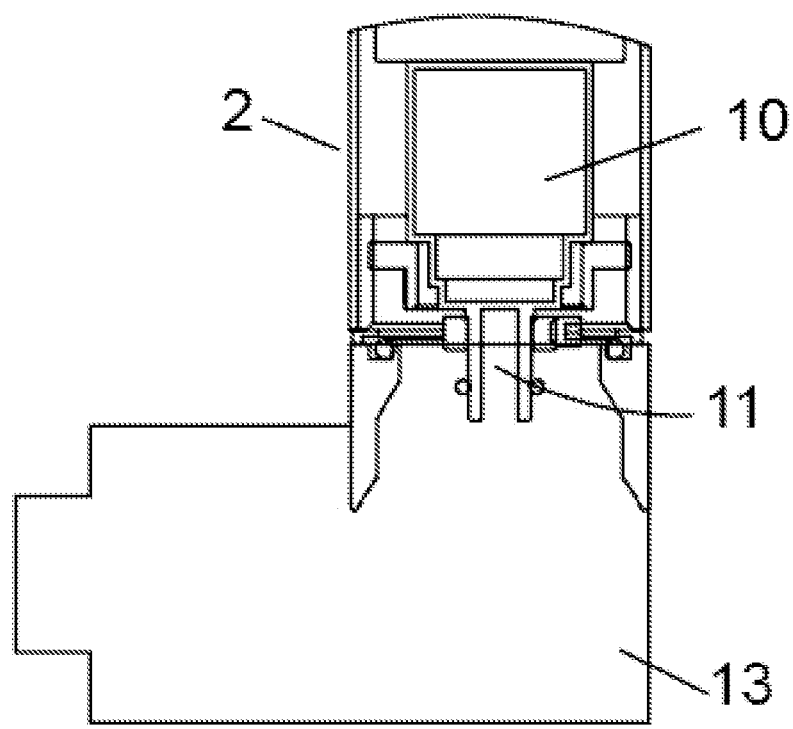
FIG. 3.—Shows the detailed section of the lower part of FIG. 1 of the shower set, the cylindrical base (2) of the vertical pipe (1) and the cartridge with axial water outlet (10) inside it on a wall outlet (13).

FIG. 3 shows the detail of how the shower set has the option to be mounted on its own. In this case, the spindle (11) of the axial cartridge is inserted into a wall-mounted water outlet (13) constructed with a mechanism similar to the one of the tap (12). The axial water outlet cartridge (10) acts in the same way with the rotation of the vertical pipe (1).

Figure 4:
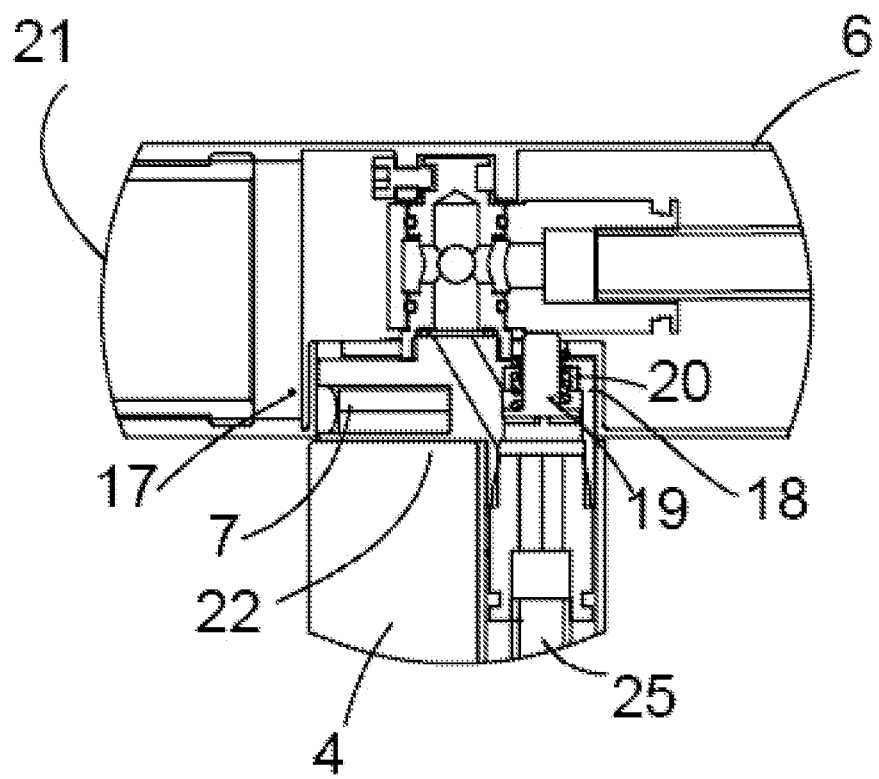
FIG. 4.—Shows the detailed section of the upper part highlighting the joint (17) of the vertical pipe (1) with the horizontal pipe (6) and the locking system (18).

FIG. 4 shows a detail of the intersection between the vertical pipe (1) and the horizontal pipe (6). The joint (17) between both pipes provides the necessary conditions to hide important innovative elements in the product range of the shower set. The first of these is a locking system (18) which prevents us from accidentally rotating the vertical pipe (1) while the water is flowing out of the upper sprinkler (3) and activating the water flow through the handheld shower (4), avoiding in this way annoying splashes. This locking system (18) functions as follows; the pressure of the water as it flows through the water line (25) to the sprinkler (3) raises a plunger (19) which is inserted into a bore prepared for this purpose, locking in this way the rotation of the vertical pipe (1). When the tap is turned off and the water stops flowing through the water line (25) of the sprinkler (3), a spring (20) returns the plunger to its original position, deactivates the locking system (18) allowing the rotation of the vertical pipe (1). The contour of the plunger base is slotted to allow reverse water flow, from the upper sprinkler to the tap, convenient and hygienic providing the tap has an evacuation system. It is also shown in this figure the attachment piece (7) which is used to correctly position and fix the flexible hose (5) and the handheld shower (4) as the locking part (22) of the handheld shower (5) is fixed to the attachment piece (7). This attachment can also be magnetic or mechanical.

Figure 5:
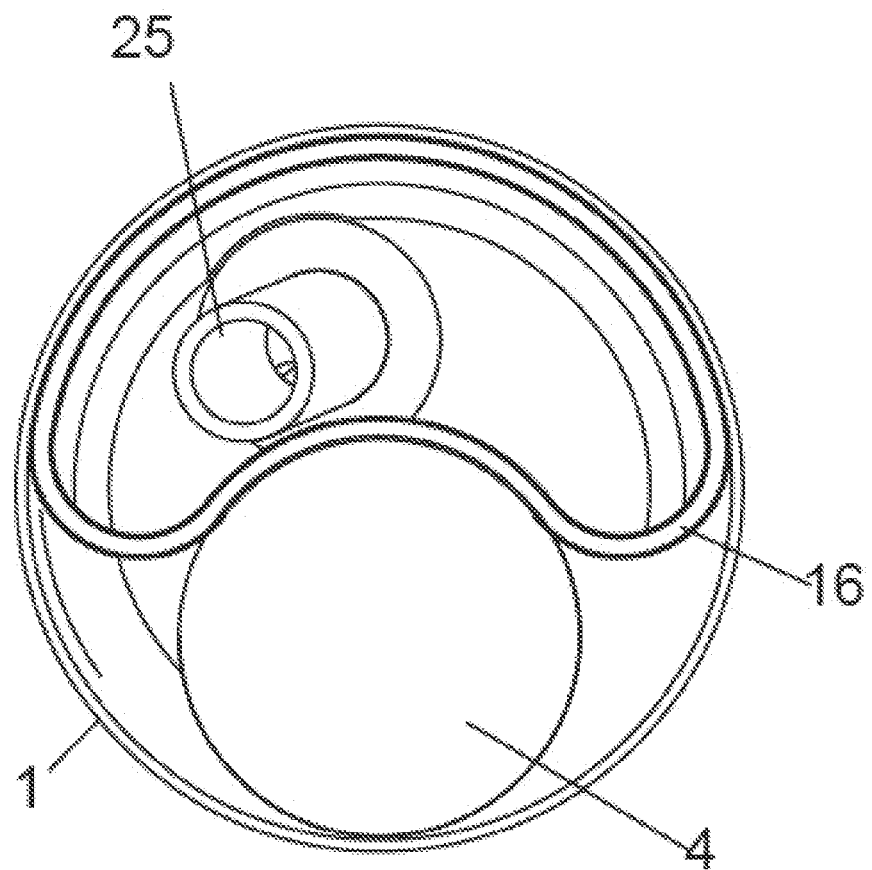
FIG. 5.—Shows a section of the vertical pipe (1) highlighting the section of the deformed long stretch (16).

FIG. 5 shows the deformation (16) of the vertical pipe, creating a convex face on it where are positioned the flexible hose (5) and the handheld shower (4).

Figure 6:
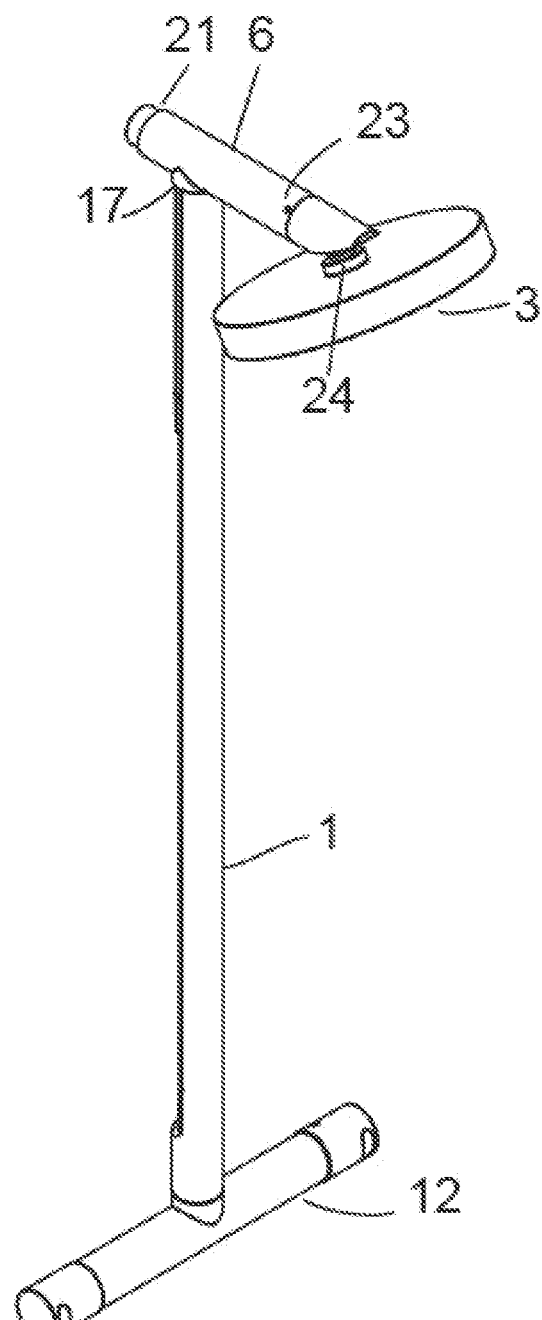
FIG. 6.—Shows a view of the shower set with the flexible hose (5) and the handheld shower (4) hidden.

FIG. 6 shows a complete shower set with the vertical pipe (1) connected to the tap (12) rotated to hide the flexible hose (5) and the handheld shower (4). At the opposite edge is to find the joint (17) between the vertical pipe (1) and the horizontal pipe (6). At the fixed to the wall edge of the horizontal pipe (6) it is possible to see the position adjustment system (21), the two sections of the horizontal pipe (6) that allow the adjustment of its length with a telescopic system (23) and at the free edge, the furthest one from the wall, a cut to angle (24) that generates a face where is fixed the upper sprinkler (3).

Figure 7:
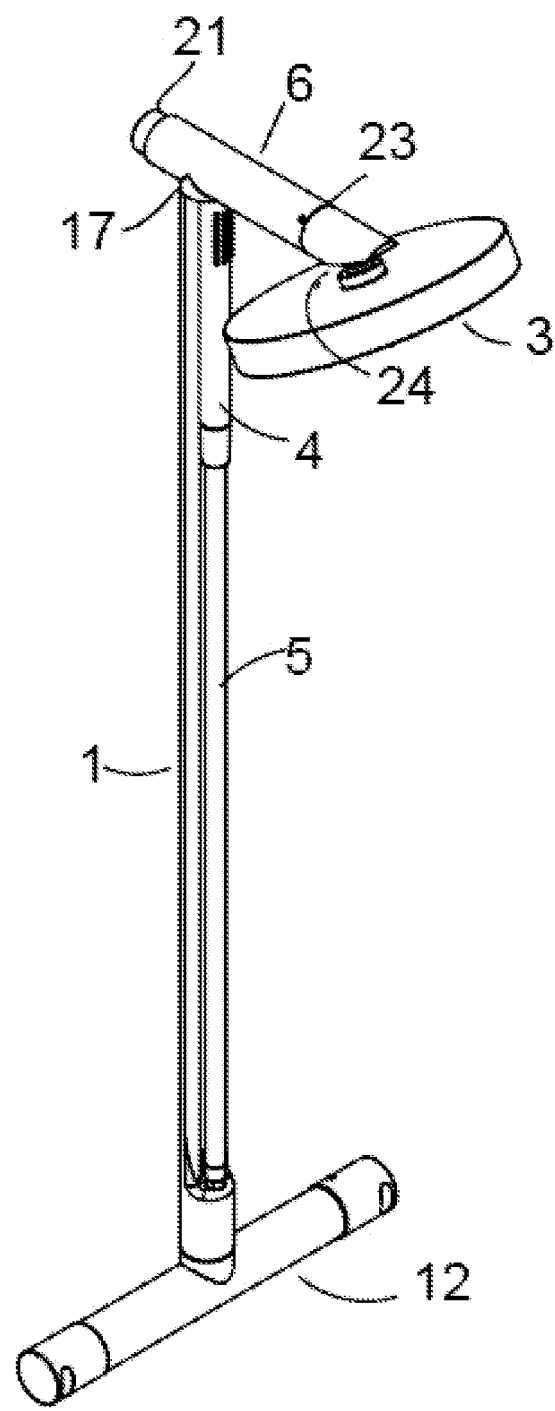
FIG. 7.—Shows a view of the shower set with the flexible hose (5) and the handheld shower (4) visible.

FIG. 7 shows a complete shower set with the vertical pipe (1) connected to the tap (12) rotated to show the flexible hose (5) and the handheld shower (4) and at the opposite edge, as in the previous figure, the joint (17) of the vertical pipe (1) to the horizontal pipe (6). The rotation of the vertical pipe activates the selector mechanism of the axial water outlet cartridge (10) which opens the water supply to the sprinkler (3) when the flexible hose (5) and the handheld shower head (4) are hidden; on the other hand, it opens the water supply to the flexible hose (5) and handheld shower head (4) when they are visible.

All information referring to examples or embodiments is part of the description of the invention.

The invention claimed is:

1. A shower set comprising:
    a base (2);
    a vertical pipe having a cylindrical portion coupled to the base (2);
    a mechanism within the base (2) consisting of a cartridge having an axial water outlet (10) configured as a collector for water input and ceramic selector discs configured to provide two separate water outlets, including a sprinkler (14) water outlet and a shower (15) water outlet;
    wherein the vertical pipe has a deformation along a portion thereof to integrate a flexible hose (5) and a handheld shower head (4);
    a water line (25) within the vertical pipe connected to the sprinkler (14) water outlet;
    wherein the vertical pipe rotates to move the ceramic selector discs of the cartridge (10) so that, in a first position the flexible hose (5) and the handheld shower head (4) are hidden behind a closed portion of the vertical pipe and, the sprinkler (14) water outlet is opened to an upper sprinkler (3) and, in a second position the flexible hose (5) and the handheld shower head (4) are not hidden behind the closed portion of the vertical pipe and the shower (15) water outlet is opened; and
    wherein the vertical pipe is connected at an upper free edge thereof with a horizontal pipe (6) by a joint (17), the horizontal pipe (6) having an attachment piece (7) to fix the handheld shower head (4) thereto.

2. The shower set according to claim 1, wherein a spindle (11) of the cartridge has a faceted or knurled surface and is inserted and fixed to a tap water outlet (12) or to a wall water outlet (13).

3. The shower set according to claim 1, wherein the deformation along the portion of the vertical pipe (1) forms a convex face.

4. The shower set according to claim 3, wherein a chamfer (26) is formed in a transition from the convex face to a concave face in the vertical pipe (1), the vertical pipe having a path (27) therein for the flexible hose (5) to pass through.

5. The shower set according to claim 1, comprising a locking mechanism (18) within the joint (17) that consists of a plunger (19) connected to the water line (25) which is raised by pressure of water flow and a spring (20) which returns the plunger to an original position when water flow ceases, the plunger (19) being slotted at a base thereof to allow evacuation of water from the upper sprinkler (3) and the horizontal pipe (6) to the water line (25).

6. The shower set according to claim 1, wherein the water line (25) and the flexible hose (5) and the handheld shower head (4) are connected to an upper side of a tap water outlet (12).

7. The shower set according to claim 1, wherein the attachment piece (7) is either magnetic or mechanical.

8. The shower set according to claim 1, wherein an upper free edge of the handheld shower head (4) is covered with a ferromagnetic piece.

\* \* \* \* \*